United States Patent Office 3,467,728
Patented Sept. 16, 1969

3,467,728
ISOMERIZATION PROCESS
George L. Hervert, Downers Grove, Ill., assignor to Universal Oil Products Company, Des Plaines, Ill., a corporation of Delaware
No Drawing. Filed Oct. 31, 1966, Ser. No. 590,541
Int. Cl. C07c 5/24
U.S. Cl. 260—683.2
9 Claims

ABSTRACT OF THE DISCLOSURE

Process for isomerizing an isomerizable olefinic hydrocarbon, such as 1-butene or 1-pentene, by contacting the hydrocarbon at a temperature of 0°–425° C. and a pressure of 1–200 atmospheres with a catalyst comprising a crystalline aluminosilicate combined with a substantially anhydrous boron halide. The catalyst is exemplified by the hydrogen form of faujasite or mordenite combined with substantially anhydrous $BF_3$. The catalyst may further comprise such $BF_3$-modified crystalline aluminosilicate suspended in an alumina, silica or silica-alumina matrix.

---

This invention relates to a conversion process for the isomerization of an isomerizable olefinic hydrocarbon into more useful compounds. More specifically, this invention is concerned with a conversion process for the isomerization of an isomerizable olefinic hydrocarbon utilizing a novel catalyst comprising a crystalline aluminosilicate combined with a substantially anhydrous boron halide.

I have discovered a catalyst which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable olefinic hydrocarbons utilizing a novel isomerization catalyst.

A specific object of this invention is to provide a novel method and a novel catalyst for isomerizing isomerizable olefinic hydrocarbons to provide the desired isomerized product in high yields without the inducing of other decomposition reactions.

One embodiment of the invention relates to a conversion process which comprises isomerizing an isomerizable olefinic hydrocarbon at a temperature in the range of from about 0° to about 425° C. and a pressure in the range of from about atmospheric to about 200 atmospheres in contact with a catalyst comprising a crystalline aluminosilicate combined with a substantially anhydrous boron halide.

Another embodiment of this invention relates to a conversion process which comprises isomerizing an isomerizable olefinic hydrocarbon at a temperature in the range of from about 0° to about 425° C. and a pressure in the range of from about atmospheric to about 200 atmospheres in contact with a catalyst comprising a crystalline aluminosilicate that contains silica and alumina tetrahedra having uniform pores of between 4 and 15 Angstroms combined with substantially anhydrous boron trifluoride.

Other objects and embodiments referring to alternative isomerizable olefinic hydrocarbons and to alternative catalytic compositions of matter will be found in the following further detailed description of the invention.

The process of my invention is applicable to the isomerization of isomerizable olefinic hydrocarbon including, for example, the isomerization of 1-butene to 2-butene, the isomerization of 3-methyl-1-butene to 2-methyl-2-butene. Also, the process of this invention can be utilized to shift the double bond of an olefinic hydrocarbon such as 1-pentene, 1-hexene, 2-hexene and 4-methyl-1-pentene to a more centrally located position so that 2-penene, 2-hexene, 3-hexene and 4-methyl-2-pentene, respectively, can be obtained. It is not intended to limit this invention to those enumerated olefinic hydrocarbons set out above as it is contemplated that shifting of the double bond to a more centrally located position may be effected in straight or branched chain olefinic hydrocarbons containing up to about 20 carbon atoms per molecule according to the process of the present invention.

As set forth hereinabove, the process of my invention is applicable to the isomerization of olefinic hydrocarbons. Furthermore, these unsaturated hydrocarbons may be derived as selective fractions from various naturally occurring petroleum streams. For example, they may be separated as individual components or, as certain boiling range fractions by selective fractionation and distillation of catalytically cracked gas oil. Thus, the process of this invention may be successfully applied to and utilized for complete conversion of isomerizable olefinic hydrocarbons when these isomerizable olefinic hydrocarbons are present in minor quantities in various liquid or gas streams. Thus, the isomerizable olefinic hydrocarbon for use in the process of this invention need not be concentrated. For example, isomerizable olefinic hydrocarbons appear in minor quantities in various refinery gas streams, usually diluted with gases such as hydrogen, nitrogen, methane, ethane, propane, etc. These refinery streams containing minor quantities of isomerizable olefinic hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery gas streams known as off-gas streams containing relatively minor quantities of isomerizable olefinic hydrocarbons.

As hereinbefore set forth, the invention is concerned with a conversion process for the isomerization of isomerizable olefinic hydrocarbons, said process being effected in the presence of a catalyst which possesses a high degree of hydrocarbon conversion activity and is particularly effective as an isomerization catalyst for the isomerizable olefinic hydrocarbons hereinabove set forth. The catalyst comprises a crystalline aluminosilicate combined with a substantially anhydrous boron halide. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes of from about 4 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates, both synthetic and natural occurring. It is preferable that the pore mouths of the crystalline aluminosilicates have cross-sectional diameter of from about 4 to about 15 Angstrom units. Among the preferable crystalline aluminosilicates that are suitable are the hydrogen and/or polyvalent forms of faujasite, and mordenite, and especially preferable is the hydrogen form of mordenite.

The concentration of crystalline aluminosilicate may be as high as 100% or the crystalline aluminosilicate may be held within a matrix which may be selected from the group consisting of silica, alumina, and silica-alumina mixtures.

As set forth hereinabove, the catalyst comprises a crystalline aluminosilicate that is combined with a boron halide to effect combination of the crystalline aluminosilicate with the boron halide. A particularly preferred boron halide is boron trifluoride although the invention is not restricted to its use but may employ any of the known boron halides insofar as they are adaptable. However, it is not intended to infer that different boron halides which may be employed will produce catalysts which have identical effects upon any given organic reaction as each of the catalysts produced from different boron halides may exert its own characteristic action.

The catalyst of the present invention comprises a crystalline aluminosilicate combined with a substantially anhydrous boron halide so as to effect combination of the crystalline aluminosilicate with the boron halide and it is the particular association of these components which results in the unusual catalytic properties of this catalyst. The boron halide may be combined with the crystalline aluminosilicate at temperatures in the range of from about 0° to about 300° C. and at a pressure of from about atmospheric to about 200 atmospheres. When the boron halide utilized is boron trifluoride, fluoride concentrations of between 0.01 weight percent to about 30 weight percent are preferred.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the isomerizable olefinic hydrocarbon is continuously charged to a reaction zone containing a fixed bed of the desired catalyst, said zone being maintained at the proper operating conditions of temperature and pressure, that is, a temperature in the range of from about 0° to about 425° C. or more, and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as boron halide, helium, hydrogen, nitrogen, argon, etc., may also be continuously charged to the reaction zone if desired. Another continuous type operation comprises the moving bed type in which the isomerizable olefinic hydrocarbon and the catalyst bed move either concurrently or countercurrently to each other while passing through said reaction zone.

Still another type of operation which may be used is the batch type operation in which a quantity of the isomerizable olefinic hydrocarbon and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room tempreature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

Example I 35.8 grams of hydrogen form faujasite ⅛ inch diameter pills were prepared and placed in a Pyrex tube which was then placed in a vertical electric furnace. A stream of 100% boron trifluoride was passed into the tube containing the hydrogen form faujasite pills and maintained thereat for 13 hours at 149° C. The temperature within the hydrogen form faujasite bed increased to 299° C. indicating that combination had occurred. The boron trifluoride-treated hydrogen form faujasite pills were then removed from the tube and it was found that there was a 14.2 gram gain in weight of the pills. Analysis of the finished catalytic composite showed that the composite contained 20.7 weight percent fluoride. This catalyst is designated as catalyst A.

Example II 65 grams of hydrogen form mordenite 1/16 inch diameter spheres are prepared and placed in the Pyrex tube which is then placed in a vertical electric furnace. A stream of 100% boron trifluoride is passed into the tube containing the hydrogen form mordenite and maintained thereat for 11 hours at 100° C. The temperature within the hydrogen form of mordenite bed increases indicating that combination occurs. The boron trifluoride-treated hydrogen form of mordenite spheres is then removed from the tube and it is found that there is a gain in the weight of the pills. Analysis of the finished catalytic composite indicates that boron trifluoride has combined with the mordenite support. This catalyst is designated as catalyst B.

Example III

The catalyst designated as catalyst A prepared according to Example I above is utilized in an isomerization reaction, the finished catalyst being placed in an appropriate continuous isomerization apparatus. In the experiment, 1-butene is charged to the isomerization zone. The reactor is maintained at about 410 p.s.i.g. and 120° C. Substantial conversion of the 1-butene to cis- and trans-2-butene is obtained as is evidenced by gas-liquid chromatography.

Example IV

A second portion of the catalyst prepared according to Example I and designated as catalyst A is again utilized in an appropriate continuous isomerization apparatus. In the experiment, the finished catalyst is placed in the isomerization reaction zone and 1-pentene is charged to said reaction zone. The reactor is maintained at about 400 p.s.i.g. and about 150° C. Substantial conversion of the 1-pentene to 2-pentene is obtained as is evidenced by gas-liquid chromatography.

Example V

The catalyst prepared according to Example II and designated as catalyst B is utilized in an appropriate continuous isomerization apparatus to determine the isomerization activity of said catalyst. In the experiment, the catalyst is placed in the isomerization reaction zone and 1-hexene is charged to said reaction zone. The reactor is maintained at about 400 p.s.i.g. and a temperature of about 150° C. Gas-liquid chromatographic analyses of the product stream indicate that substantial conversion occurs with the major product being 2-hexene.

Example VI

The catalyst prepared according to Example II and designated as catalyst B is utilized in an appropriate isomerization apparatus to determine the isomerization activity of said catalyst. In the experiment, a fresh batch of finished catalyst is placed in the isomerization reaction zone and 3-methyl-1-butene charged thereto. The reactor is maintained at about 400 p.s.i.g. and about 180° C. Substantial conversion of the 3-methyl-1-butene to 2-methyl-2-butene is obtained as is evidenced by gas-liquid chromatography.

I claim as my invention:

1. Process for isomerizing an isomerizable olefinic hydrocarbon which comprises contacting said hydrocarbon, at a temperature of from about 0° to about 425° C. and a pressure of from about atmospheric to about 200 atmospheres, with a catalyst comprising a crystalline aluminosilicate containing silica and alumina tetraheda having uniform pores of between about 4 and 15 Angstroms combined with substantially anhydrous boron trifluoride.

2. The process of claim 1 further characterized in that said crystalline aluminosilicate is suspended in an alumina matrix.

3. The process of claim 1 further characterized in that said crystalline aluminosilicate is suspended in a silica matrix.

4. The process of claim 1 further characterized in that said crystalline aluminosilicate is suspended in a silica-alumina matrix.

5. The process of claim 1 further characterized in that said crystalline aluminosilicate is the hydrogen form of faujasite.

6. The process of claim 1 further characterized in that said crystalline aluminosilicate is the hydrogen form of mordenite.

7. The process of claim 1 further characterized in that said isomerizable olefinic hydrocarbon is 1-butene.

8. The process of claim 1 further characterized in that said isomerizable olefinic hydrocarbon is 1-pentene.

9. The process of claim 1 further characterized in that said isomerizable olefinic hydrocarbon is 3-methyl-1-butene.

References Cited

FOREIGN PATENTS 256,988  5/1963  Australia.

DELBERT E. GANTZ, Primary Examiner
G. J. CRASANAKIS, Assistant Examiner

U.S. Cl. X.R.
252—433